April 2, 1929.  C. L. MATTISON  1,707,764
MACHINE TOOL
Filed Aug. 9, 1926  3 Sheets-Sheet 1
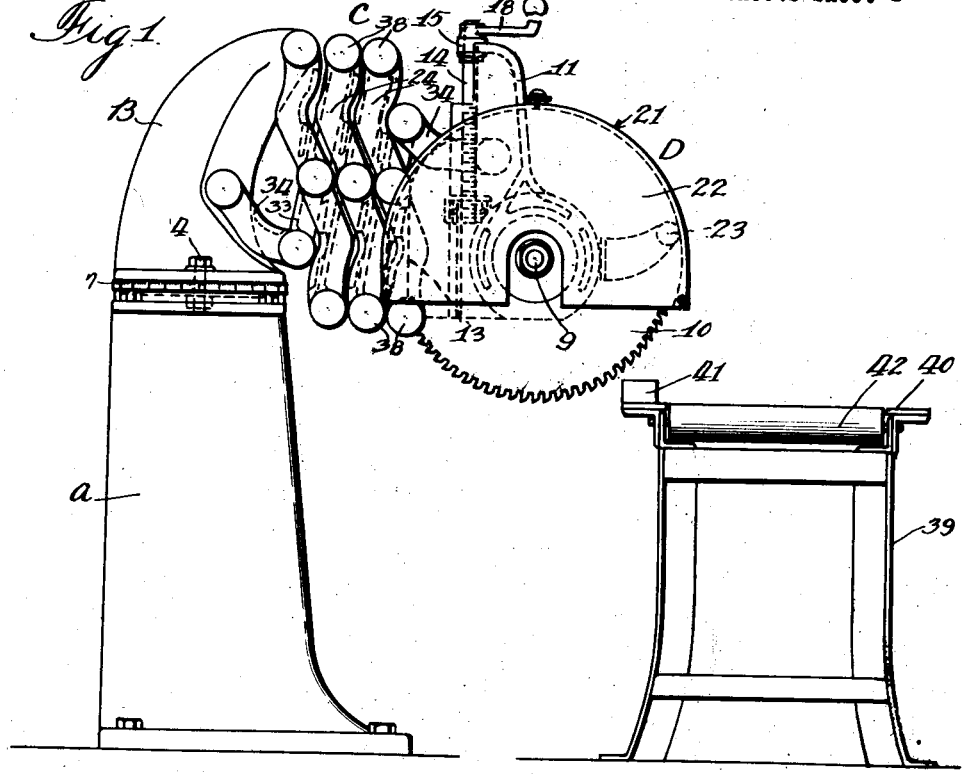
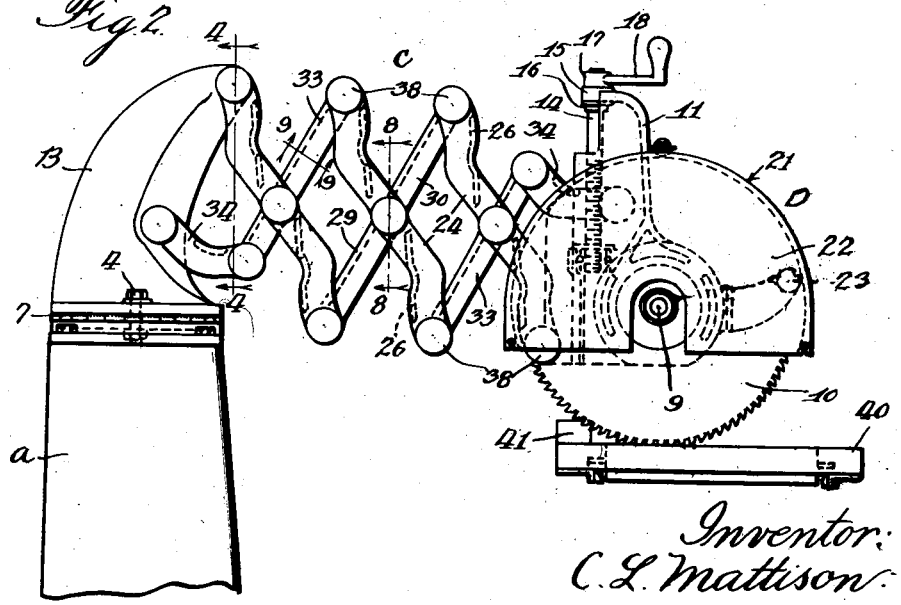
Inventor:
C. L. Mattison
By Churchill Parker Carlson
Attys April 2, 1929. C. L. MATTISON 1,707,764
MACHINE TOOL
Filed Aug. 9, 1926 3 Sheets-Sheet 2
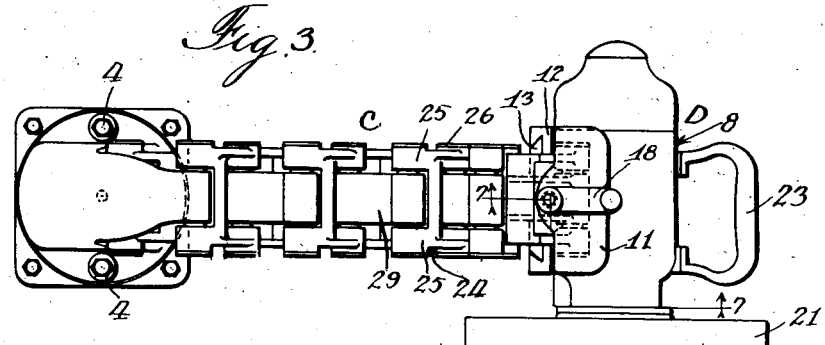
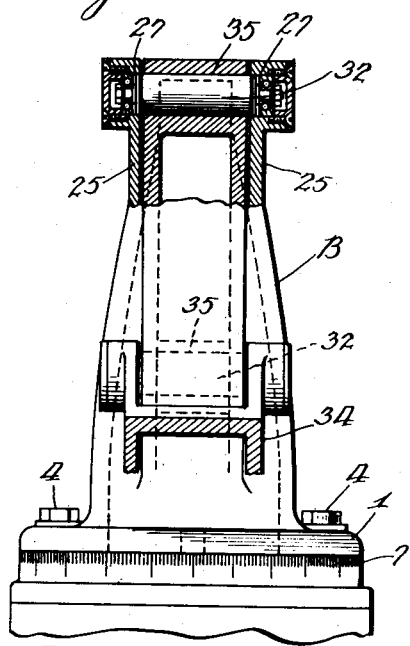
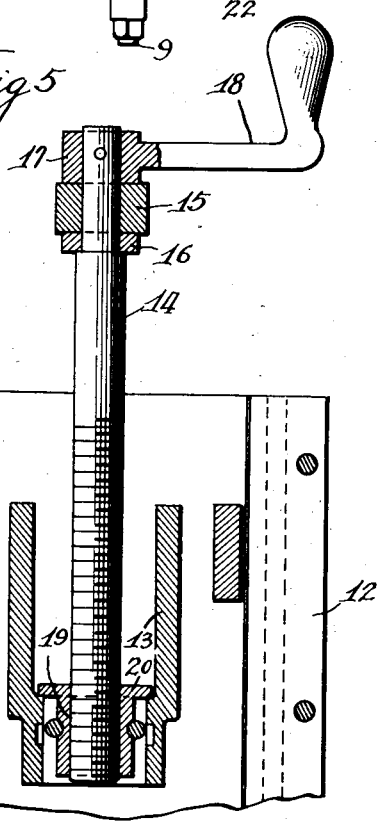
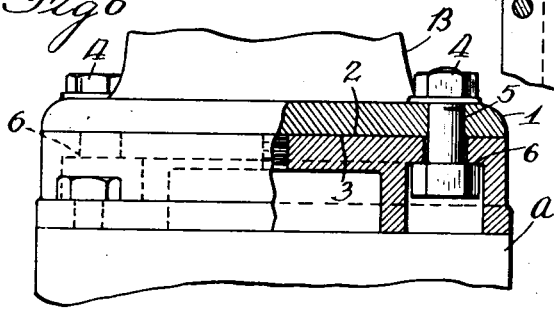

April 2, 1929.  C. L. MATTISON  1,707,764
MACHINE TOOL
Filed Aug. 9, 1926   3 Sheets-Sheet 3
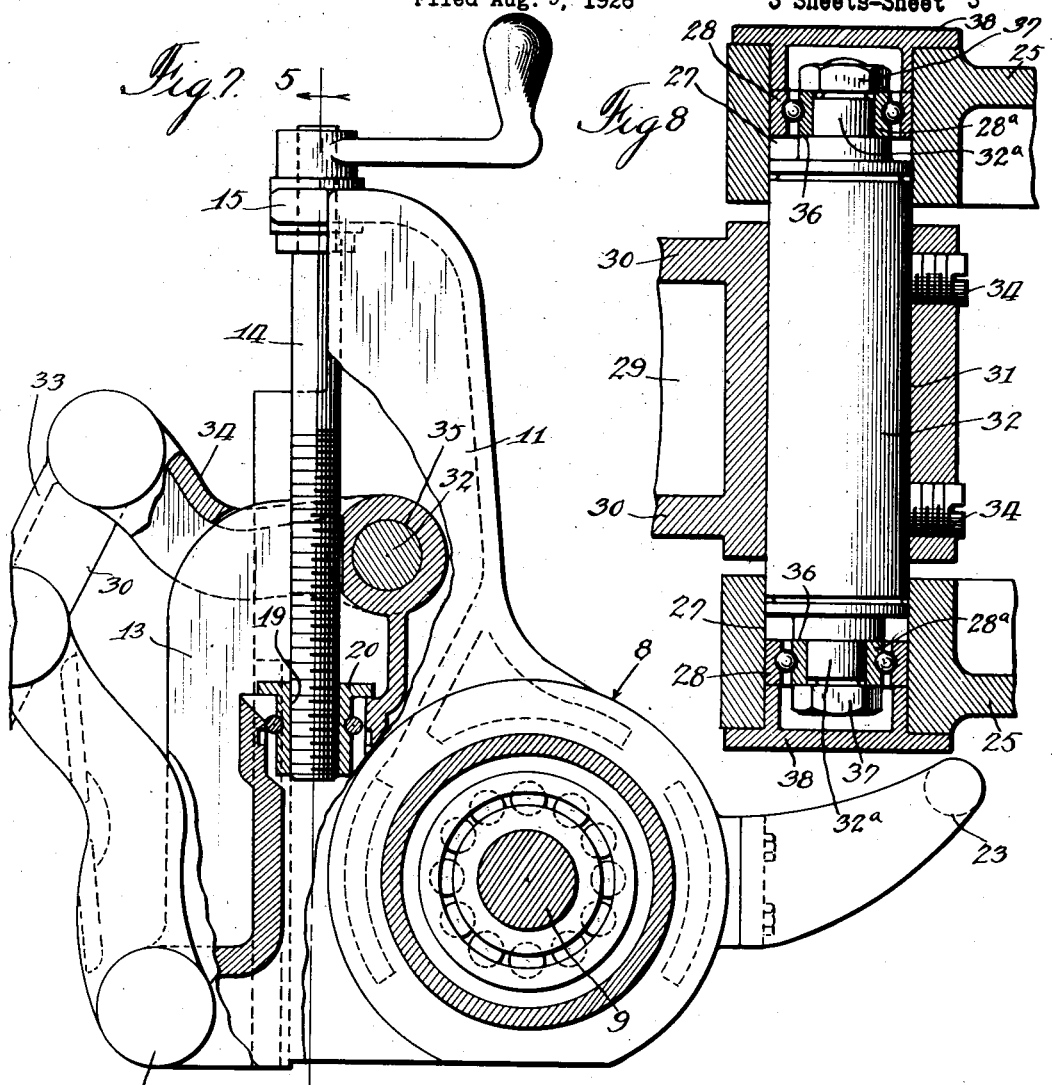
Inventor.
C. L. Mattison
By Churchill Parker Carlson
Attys.

Patented Apr. 2, 1929.

1,707,764

UNITED STATES PATENT OFFICE.

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS.

MACHINE TOOL.

Application filed August 9, 1926. Serial No. 127,992.

The invention relates to machine tools, more particularly to those in which the processing operation is performed upon stationary work by an operating tool moved into engagement with the work.

Heretofore, it has been the practice in mounting such tools as, for example, a cross-cut circular saw, to support the tool upon a sliding carriage or upon a swinging structure of long radius. Such construction involves in the one case, heavy cumbersome parts difficult of quick manipulation and occupying much floor space, and in the latter case involves generally a considerable overhead structure which is difficult of accurate control and guidance.

It is the principal object of this invention to provide a machine tool adapted for the operative movement of its processing tool through a substantially horizontal path, which is self-contained, compact in structure, highly efficient in operation, and exceedingly easy of manual manipulation.

Another object is to provide a machine tool in which the operating tool is carried at the free end of a readily extensible and retractable structure requiring a small base support occupying comparatively little floor space.

It is a further object of the invention to provide in a tool of this type an extensible frame specially constructed to resist swaying and torsional movement so as to insure straight line reciprocation of the tool.

It is a further object of the invention to provide a new and improved reciprocating machine structure in which the movable parts are of light weight and constructed to permit of easy manipulation.

Further objects and advantages of the invention will be understood from the following detailed description taken in connection with the accompanying drawings which form a part of this specification.

The accompanying drawings illustrate the invention as adapted to a machine tool commonly known in the woodworking art as a power-driven circular cross-cut or cut-off saw. It is desired, however, that the illustration herein be not considered as limiting the adaptation of the invention to sawing machine tools, as it will be obvious that the novel structure herein disclosed may be employed in various machine tools in which free movement of the processing tool in a substantially horizontal plane is essential. It is pointed out that the pivotally adjustable base mounting of the extensible structure comprising a part of the invention permits its adaptation to use selectively for moving a tool in a true rectilinear path in any radial direction or for universal movement over its plane of operation from a free pivotal base. It is further pointed out that the base support of the machine may be arranged to be secured to a wall instead of a floor. Referring to the drawings:

Fig. 1 is a side elevation of the preferred form of the invention, together with a work table, the saw being in its inoperative position with the supporting frame collapsed.

Fig. 2 is a fragmental view similar to Fig. 1 except that the saw is in its operative position and the supporting frame extended.

Fig. 3 is a plan view showing the supporting frame extended.

Fig. 4 is a section taken along the line 4—4 of Fig. 2.

Fig. 5 is a sectional view taken along the line 5—5 of Fig. 7.

Fig. 6 is a fragmental view partly in section showing the mounting for the swivel pedestal bracket.

Fig. 7 is an enlarged fragmental view taken along the line 7—7 of Fig. 3.

Fig. 8 is a section taken along the line 8—8 of Fig. 2.

Fig. 9 is a section taken along the line 9—9 of Fig. 2.

Fig. 10 is a view of a double link.

While my invention is susceptible of embodiment in many different forms, I have shown in the drawings and will herein describe in detail one such embodiment, with the understanding that the present disclosure is to be considered as an exemplification of the principles of the invention, and is not intended to limit the invention to the embodiment illustrated. The scope of the invention will be pointed out in the appended claims.

In the drawings I have illustrated the preferred form of the invention as comprising a pedestal *a* of a height approximating the desired distance of the tool (in this instance a saw) from the floor. This pedestal is illustrated as a rigid casting upon the upper end of which a bracket B is mounted to swivel about a vertical axis. As illustrated in Fig. 6 the pedestal and the base 1 of the bracket B are provided with opposed plane surfaces 2 and 3 respectively. A plurality of bolts 4 are adapted to enter through apertures 5 in the base of the bracket and annular inverted T-slots 6 in the pedestal to permit of clamping the bracket in any annular position as determined by a scale 7 on the pedestal and a suitable zero mark on the bracket.

The bracket is adapted to support one end of an extensible frame C, on the free end of which a tool head D is carried. By means of the swivel adjustment of the bracket the angular direction of the extension of the frame C may be varied to permit of angular operation, as for example in mitre sawing.

The tool head D, in the preferred form illustrated, comprises a housing designated generally as 8 (Figs. 3 and 7) which is adapted to contain and support a suitable motor, the shaft 9 of which extends beyond the housing to support a tool, which in this instance is a saw 10. The saw head is preferably mounted for vertical adjustment upon the free end of the extensible frame C. For this purpose a bracket 11 is formed integrally with the housing 8 and is provided with ways 12 on its rear side adapted to engage the sides of an end member 13 which is carried upon the free end of the frame C, whereby to guide the head for vertical adjustment upon the end of the frame. The vertical adjustment is provided to compensate for various saw diameters and may be obtained by any suitable means. In the exemplary form illustrated, such means comprises a screw 14 journaled at its upper end for rotational but against axial movement in an overhanging portion 15 of the bracket 11. The axial movement is prevented by means of a collar 16 and the hub 17 of an operating handle 18, both of which are secured to the screw. This screw engages a screw-threaded aperture 19 (Figs. 5 and 7) in a bushing 20 rigidly secured to the member 13 so that rotation of the screw causes a vertical movement of the saw head relative to the said member.

As mentioned hereinbefore, the shaft 9 of the motor is adapted to form a mounting for the saw 10 which may be secured thereon in an appropriate manner. A guard 21 is secured to the housing 8 and adapted to overlie the saw. This guard preferably includes a side portion 22 which is detachable to permit of removal of the saw from the arbor. A handle 23 is also secured to the housing 8 to facilitate manipulation of the saw head.

The invention contemplates an extensible means to support the saw head from the pedestal bracket B, this means being of a character such as to permit of its being supported in approximately the same horizontal plane as the saw head and also being adapted to guide the saw for movement in a vertical plane, i. e. without side sway or torsional movement. In the exemplary form illustrated herein, this means is in the form of a lazy-tongs disposed intermediate the swivel bracket B and the end member 13 and secured thereto at its opposite ends. This lazy-tongs is of improved construction and is composed of a plurality of pivotally-connected members. Alternate members 24 are preferably formed as double links and consist of a pair of laterally spaced links 25 (Figs. 3 and 10) rigidly interconnected by means of webs 26. These double links are slightly S-shaped and are formed with bores 27 at the opposite ends of the links and at their mid portions, adapted to mount bearings 28 (Fig. 8). The intermediate members of the frame are in the form of single links 29 of substantial width, and are preferably reinforced by means of side ribs 30 (see Fig. 9). These links have bores 31, one at each end of the link and one at the mid portion thereof, adapted to receive pivot pins 32 therethrough. The single links are adapted to enter the openings $26^a$ and $26^b$ in the double links and to fit between the laterally spaced bearing portions thereof so that the ends of the pivot pins may be positioned in the bores 27.

The frame in the form illustrated in the drawings comprises three double links 24, a single link 29, two short single links 33 and two short double links 34. The number of links, however, may be varied. These links are pivotally connected to each other and to the bracket B and member 13 with the bearing portions of the single links fitting between the spaced bearing portions of the double links as illustrated in Fig. 8, and with the spaced bearing portions of the end links embracing portions of the bracket B and end member 13 as shown in Figs. 3 and 4. The pivots between these parts comprise pins 32 secured in the bores 31 of the single links as by means of set screws 34. The ball bearings 28 which are interposed between the ends of the pivot pins 32 and the bores 27 in the double links provide practically frictionless pivots between the links and permit extension and contraction of the frame C with a minimum amount of effort. The bracket B and member 13 are provided with bores at 35 similar to the bores 31 of the single links adapted also to mount pivot pins 32, and are shaped to permit the bearing portions of the double links 24 and 34 to embrace the bracket and end member adjacent these pins.

As shown in Fig. 8, the inner races $28^a$ of the ball bearings 28 are secured upon reduced portions $32^a$ of the pivot pins between shoulders 36 formed thereon and nuts 37. The outer races are pressed into the bores 27 of the double links. Plugs 38 are also pressed into these bores to protect the bearings from foreign matter.

The work table may be of conventional form. As illustrated herein, it comprises a base frame 39 and a bench-like top 40. This top has a rear guide rail 41 for the work, and is preferably provided with a plurality of ball bearing rollers 42 upon which the work may be fed along the table.

It will be apparent from the foregoing that I have provided a cross cut saw which not only eliminates the objectionable overhead structure of the swing saw, but also requires but a small amount of floor space. The movable structure is of comparatively light weight and being mounted entirely upon ball bearings, the friction is negligible. This permits of manual operation with a minimum amount of effort.

It is also obvious that the construction of the extensible frame not only eliminates any possiblity of side sway and torsional movement, but also guides the saw in a substantially straight horizontal path so as to permit the saw to cut a wide piece of stock to the maximum depth the saw is adapted to cut, i. e. there is no cutting depth lost at the front and rear edges of the work as in saws of the swinging frame type wherein the saw travels through an arc of a circle. Convenient means are provided to permit mitre sawing, and also to adjust the height of the saw arbor with respect to the work table to compensate for changes in saw diameter.

It is further obvious that the machine construction herein disclosed may be readily adapted to other tools than a saw with like advantages in the operative control of the tool.

I claim as my invention:

1. A machine of the character described comprising, in combination, a support, a motor-driven tool head, and a lazy-tongs frame connected at one end to said support and at its other end to said head, said lazy-tongs including double links having pairs of laterally spaced and axially alined bearing portions at the mid portion and each end thereof, and single links adapted to fit between said spaced portions.

2. A machine of the character described comprising, in combination, a support, a motor-driven tool head, and a lazy-tongs frame connected at one end to said support and at its other end to said head, said lazy-tongs including sets of double and single links, the double links comprising two side portions, and intermediate web portions defining openings at each end and at the mid portion of the links adapted to admit the single links.

3. A tool of the character described having, in combination, a support, a vertical guide member, an extensible and contractible lazy-tongs frame comprising two series of links of different widths, the wider links comprising spaced sides adapted to straddle the narrower links and having pairs of laterally spaced alined bearing openings, the said wider links at one end of the frame embracing a portion of said support and at the other end of the frame embracing a portion of said guide member, ball bearings mounted in said bearing openings, a head mounted on said guide member for vertical sliding movement and including a motor-tool unit arranged to be moved back and forth in a substantially horizontal path by the extension and contraction of said lazy-tongs frame, and means for vertically adjusting said head on said guide member.

4. A cut-off saw of the character described comprising, in combination, a support, a pair of vertically spaced horizontally extending pivot pins on said support, a tool head carrying a self-contained motor driven saw arbor adapted for rectilinear reciprocation, a pair of vertically spaced horizontally extending pivot pins on said head, and a longitudinally extensible frame for supporting and guiding said tool head comprising a lazy-tongs, the end links of which have laterally spaced and alined bearings mounted on the ends of each of said pins.

5. In a cut-off saw, the combination of a motor driven saw arbor, a stationary base and a longitudinally extensible frame supporting said arbor from said base, said frame comprising a lazy-tongs having alternate links formed with laterally spaced and alined bearings at the opposite ends thereof and at the mid portions thereof, and other links of substantial width having bored portions arranged to fit intermediate said bearings, and pivot pins positioned in each pair of said bearings and extending through said bores of the other links.

6. A sawing machine comprising, in combination, a pedestal, a tool head embodying a motor driven saw arbor arranged to be reciprocated rectilinearly for the purpose of cutting off work pieces, and a longitudinally extensible frame connecting said head to said pedestal arranged during reciprocation of said head to support the head and to guide said saw, said frame having alternate links formed with laterally spaced and alined bearings.

7. In a machine, the combination of a reciprocatory motor driven arbor, a stationary base and a longitudinally extensible frame supporting said arbor from said base and adapted for guiding the saw rectilinearly, said frame comprising a lazy tongs having alternate links formed with laterally spaced and alined bearing portions at the opposite ends thereof, and other links of substantial width having portions arranged to fit intermediate said bearing portions, pivot pins rigidly mounted in said other links and extending through said bearing portions, and bearing means intermediate the ends of said pivot pins and said bearing portions.

In testimony whereof, I have hereunto affixed my signature.

CARL LAWRENCE MATTISON.